(12) United States Patent
Maeda et al.

(10) Patent No.: US 11,346,421 B2
(45) Date of Patent: May 31, 2022

(54) DAMPING FORCE ADJUSTABLE SHOCK ABSORBER

(71) Applicant: HITACHI AUTOMOTIVE SYSTEMS, LTD., Hitachinaka (JP)

(72) Inventors: Atsushi Maeda, Fujisawa (JP); Daiki Miyazawa, Fukushima (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 94 days.

(21) Appl. No.: 16/632,701

(22) PCT Filed: Jul. 23, 2018

(86) PCT No.: PCT/JP2018/027460
§ 371 (c)(1),
(2) Date: Jan. 21, 2020

(87) PCT Pub. No.: WO2019/021994
PCT Pub. Date: Jan. 31, 2019

(65) Prior Publication Data
US 2020/0141468 A1   May 7, 2020

(30) Foreign Application Priority Data
Jul. 26, 2017   (JP) .............................. JP2017-144523

(51) Int. Cl.
*F16F 9/46*   (2006.01)
*F16F 9/16*   (2006.01)

(52) U.S. Cl.
CPC ................ *F16F 9/461* (2013.01); *F16F 9/16* (2013.01); *F16F 9/464* (2013.01);
(Continued)

(58) Field of Classification Search
CPC .... F16F 9/461; F16F 9/16; F16F 9/464; F16F 2230/30; F16F 2230/005; F16F 2222/12; B21D 39/04; B21D 39/048
See application file for complete search history.

(56) References Cited

U.S. PATENT DOCUMENTS 2,630,887 A  *  3/1953  Paquin ............... B61D 33/0092
                                                       188/300
3,722,640 A  *  3/1973  Taylor ..................... B60R 19/32
                                                       188/316
(Continued)

FOREIGN PATENT DOCUMENTS

JP     4050611    2/2008
JP     6095853    2/2017

OTHER PUBLICATIONS

International Search Report dated Aug. 21, 2018 in International (PCT) Application No. PCT/JP2018/027460 with English-language translation.

(Continued)

*Primary Examiner* — Xuan Lan Nguyen
(74) *Attorney, Agent, or Firm* — Wenderoth, Lind & Ponack, L.L.P.

(57) ABSTRACT

A crimp portion provided to a damping force adjustable shock absorber includes a crimp groove portion provided on an outer peripheral surface of a solenoid case along a circumferential direction thereof, and one end portion of a thin wall portion of a valve case that is contained while being bent in this crimp groove portion. The crimp groove portion includes an inclined surface inclined into a case 40 from a valve case side toward a solenoid case side. Due to this configuration, the damping force adjustable shock absorber can securely fix the solenoid case and the valve case by crimping while reducing a load on a solenoid block (Continued)

and a valve block due to the crimp fixation to a minimum load.

7 Claims, 6 Drawing Sheets

(52) U.S. Cl.
CPC ... *F16F 2222/12* (2013.01); *F16F 2230/0005* (2013.01); *F16F 2230/30* (2013.01)

(56) References Cited

U.S. PATENT DOCUMENTS

| | | | | |
|---|---|---|---|---|
| 4,754,855 A | * | 7/1988 | Kuwana | F16F 9/462 188/266.4 |
| 4,928,579 A | * | 5/1990 | Emmett | F16D 65/14 188/73.38 |
| 5,163,706 A | * | 11/1992 | Maguran, Jr. | F16F 9/465 137/854 |
| 5,462,142 A | | 10/1995 | Handke et al. | |
| 6,065,573 A | * | 5/2000 | Kelly | F16F 9/44 188/319.1 |
| 6,851,659 B2 | | 2/2005 | Zutt et al. | |
| 2016/0329781 A1 | | 11/2016 | Onishi et al. | |

OTHER PUBLICATIONS

International Preliminary Report on Patentability dated Aug. 21, 2018 in International (PCT) Application No. PCT/JP2018/027460 with English-language translation.

Office Action dated Feb. 23, 2021 in corresponding Korean Patent Application No. 10-2020-7002313 with English-language translation.

* cited by examiner

DAMPING FORCE ADJUSTABLE SHOCK ABSORBER

TECHNICAL FIELD

The present invention relates to a damping force adjustable shock absorber provided in, for example, suspension apparatus of an automobile or a railway train, and configured to generate a damping force by controlling a flow of hydraulic fluid with use of a damping force generation unit with respect to a stroke of a piston rod. The present invention especially relates to a damping force adjustable shock absorber including a solenoid for controlling a characteristic of the damping force to be generated by the damping force generation unit.

BACKGROUND ART

Generally, the above-described damping force adjustable shock absorber is configured in such a manner that a piston with the piston rod coupled therewith is slidably fittedly inserted in a cylinder sealingly containing the hydraulic fluid, and the damping force is generated by controlling the flow of the fluid generated due to a sliding movement of the piston in the cylinder with use of the damping force generation unit with respect to the stroke of the piston rod. This damping force generation unit employs a configuration that controls the damping force characteristic by controlling electric current supply to the solenoid. Further, the damping force generation unit is configured in such a manner that a solenoid case containing the solenoid and a valve case containing a valve mechanism are coupled with each other with use of a nut member.

As described above, the conventional damping force adjustable shock absorber employs the structure that couples the solenoid case and the valve case with each other with use of the nut member as a releasable structure, but the use of the connection between them using the nut member is stopped and is replaced with a structure that fixes the solenoid case and the valve case with each other by crimping as an unreleasable structure (refer to PTL 1).

CITATION LIST

Patent Literature

PTL 1: U.S. Pat. No. 5,462,142

SUMMARY OF INVENTION

Technical Problem

The shock absorber discussed in the above-described patent literature, PTL 1 includes a crimp groove rectangular in cross section that is formed on an outer peripheral wall of the valve case along a circumferential direction, and a sleeve-shaped extension portion connected to the solenoid case and the crimp groove portion are crimped and fixed by applying a shaping load at a position of an outer peripheral wall of the sleeve-shaped extension portion that corresponds to the crimp groove portion with use of a crimping tool.

However, the crimp fixation at the shock absorber discussed in PTL 1 may raise a risk of damaging each component of the solenoid and the valve mechanism due to application of a large shaping load to the solenoid and the valve mechanism because a large shaping load is applied inward from a radially outer side of the sleeve-shaped extension portion by the crimping tool when the crimp is shaped.

Solution to Problem

The present invention is directed to providing a damping force adjustable shock absorber including a crimp portion capable of securely fixing the solenoid case and the valve case by crimping while reducing a load to a solenoid block and a valve block due to the crimping fixation to a minimum load.

According to one aspect of the present invention, a damping force adjustable shock absorber includes a tubular member containing therein a damping force generation unit and a solenoid configured to drive the damping force generation unit. The damping force adjustable shock absorber generates a damping force by controlling a flow of hydraulic fluid accompanying a movement of a piston in a cylinder with use of the damping force generation unit contained in the tubular member. The tubular member includes a first tubular body, second tubular body disposed outside this first tubular body and arranged along a direction in which this first tubular body extends, and a crimp portion configured to fix the second tubular body to the first tubular body to crimp it. The crimp portion includes a groove portion provided on an outer peripheral surface of the first tubular body along a circumferential direction thereof, and an end portion of the second tubular body contained while being bent in this groove portion. The groove portion includes an inclined surface inclined into the tubular member from a second tubular body side where the second tubular body is located toward a first tubular body side where the first tubular body is located.

The damping force adjustable shock absorber according to the one aspect of the present invention can securely fix the solenoid case and the valve case by crimping so as to have a predetermined detachment load while reducing the load on the solenoid block and the valve block due to the crimp fixation to a minimum load with the aid of the crimp portion provided to this damping force adjustable shock absorber.

DESCRIPTION OF EMBODIMENTS

In the following description, one embodiment of the present invention will be described in detail with reference to the drawings.

A damping force adjustable shock absorber 1 according to the present embodiment is employed as a vertical damper for a railway train that is mounted between a vehicle body and a bogie in a vertically oriented state. The damping force adjustable shock absorber 1 will be described as the vertical damper for a railway train that is mounted in the vertically oriented state in the present embodiment by way of example, but may be used for a horizontal damper or a yaw damper. Further, the damping force adjustable shock absorber 1 according to the present embodiment may be employed as a damper for an automobile.

Figure 1:
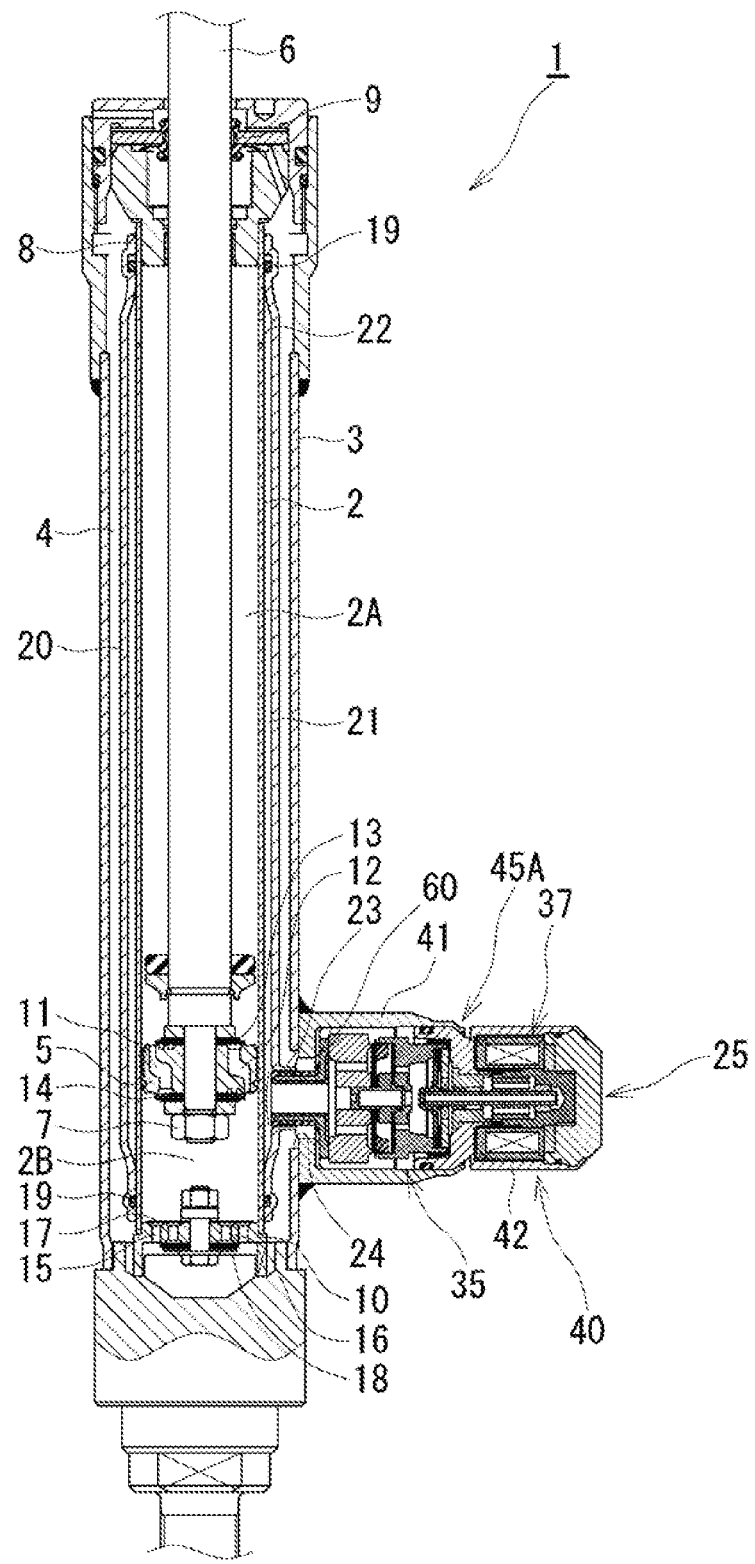
FIG. 1 is a cross-sectional view of a damping force adjustable shock absorber according to an embodiment of the present invention.

As illustrated in FIG. 1, the damping force adjustable shock absorber 1 according to the present embodiment employs a twin-tube structure including an outer tube 3 outside a cylinder 2 concentrically with this cylinder 2. A reservoir 4 is formed between the cylinder 2 and the outer tube 3. A piston 5 is slidably fittedly inserted in the cylinder 2. The inside of the cylinder 2 is divided by this piston 5 into two chambers, a cylinder upper chamber 2A and a cylinder lower chamber 2B. A lower end of a piston rod 6 is coupled with the piston 5 with use of a nut 7. An upper end side of the piston rod 6 passes through the cylinder upper chamber 2A, is inserted through a rod guide 8 and an oil seal 9 mounted at upper end portions of the cylinder 2 and the outer tube 3, and then extends out of the cylinder 2. A base valve 10 is provided at a lower end portion of the cylinder 2. The base valve 10 divides the cylinder lower chamber 2B and the reservoir 4 from each other.

Passages 11 and 12 are provided at the piston 5. The passages 11 and 12 establish communication between the cylinder upper chamber 2A and the cylinder lower chamber 2B. A check valve 13 is provided in the passage 12. The check valve 13 permits only a flow of hydraulic fluid from the cylinder lower chamber 2B side toward the cylinder upper chamber 2A side. On the other hand, a disk valve 14 is provided in the passage 11. When a pressure of the hydraulic fluid on the cylinder upper chamber 2A side reaches a predetermined pressure, the disk valve 14 is opened to release the pressure toward the cylinder lower chamber 2B side.

Passages 15 and 16 are provided at the piston 10. The passages 15 and 16 establish communication between the cylinder lower chamber 2B and the reservoir 4. A check valve 17 is provided in the passage 15. The check valve 17 permits only a flow of the hydraulic fluid from the reservoir 4 side toward the cylinder lower chamber 2B side. On the other hand, a disk valve 18 is provided in the passage 16. When a pressure of the hydraulic fluid on the cylinder lower chamber 2B side reaches a predetermined pressure, the disk valve 18 is opened to release the pressure toward the reservoir 4 side. Oil fluid is sealingly contained in the cylinder 2 and oil fluid and gas are sealingly contained in the reservoir 4 as the hydraulic fluid.

A separator tube 20 is externally fitted to the cylinder 2 via seal members 19 and 19 disposed at both upper and lower end portions thereof, and an annular passage 21 is formed between the cylinder 2 and the separator tube 20. The annular passage 21 is in communication with the cylinder upper chamber 2A via a passage 22 provided on a sidewall near the upper end portion of the cylinder 2. A cylindrical connection port 23 is formed at a lower portion of the separator tube 20. The connection port 23 is opened while protruding radially outward. Further, an opening 24 is provided on an outer peripheral wall of the outer tube 3. The opening 24 is concentric with the connection port 23 and larger in diameter than the connection port 23. A damping force generation unit 25 is attached so as to surround the opening 24 on an outer side of the outer peripheral wall of the lower portion of the outer tube 3.

In the following description, the damping force generation unit 25 will be described with reference to FIGS. 1 and 2, in which the other end side and one end side are defined to be a closer side to the outer tube 3 and a farther side away from the outer tube 3, respectively, for facilitating the understanding of the following description.

Figure 2:
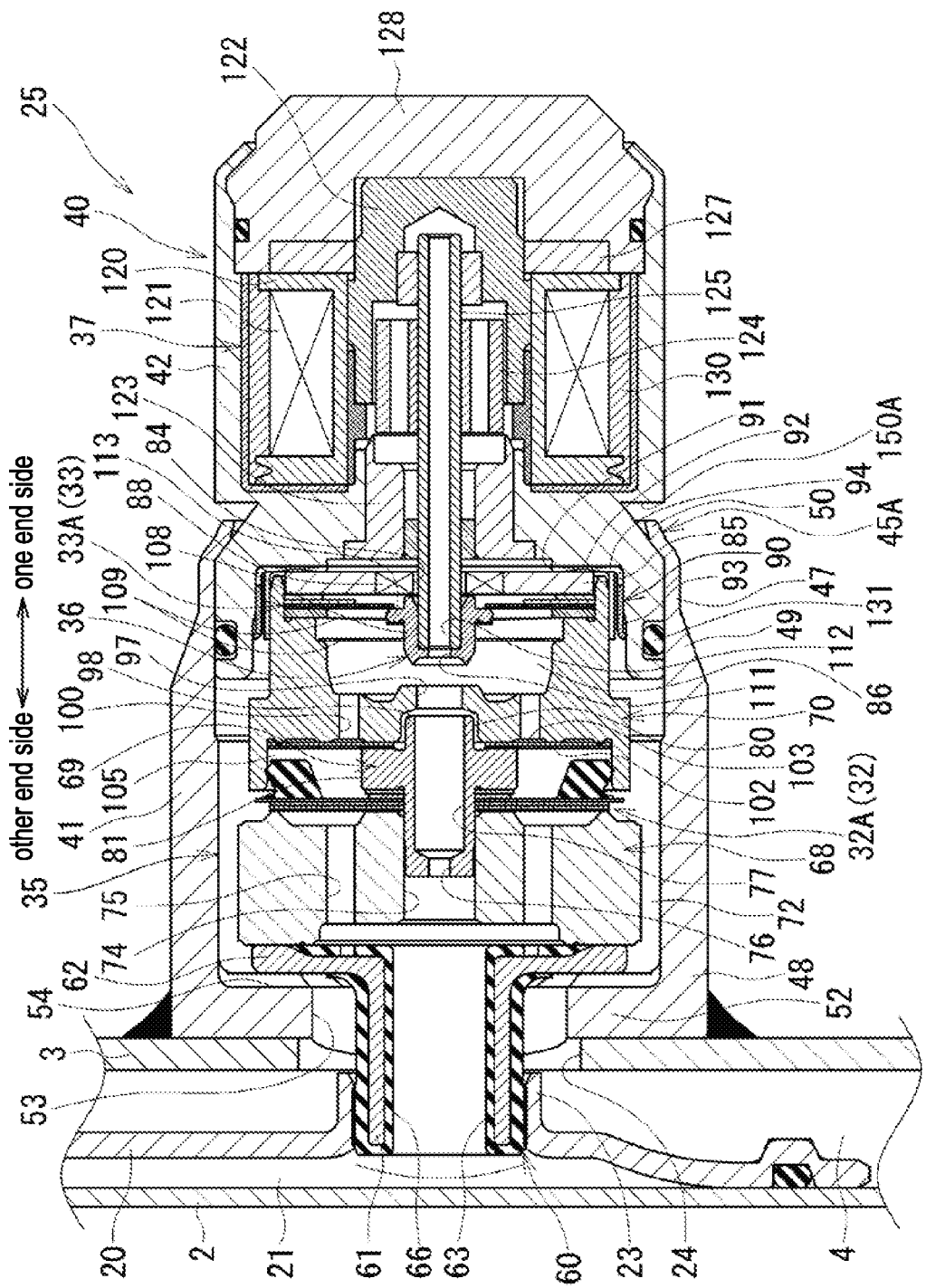
FIG. 2 is an enlarged cross-sectional view of a damping force generation unit provided to the damping force adjustable shock absorber according to the present embodiment.

As illustrated in FIG. 2, the damping force generation unit 25 includes a valve block 35 and a solenoid block 37. The valve block 35 includes a pilot-type main valve 32, a failure-safe valve 33 actuated at the time of a failure, and the like. The solenoid block 37 actuates a pilot valve 36, which is a solenoid-driven pressure control valve for controlling a pressure for opening the main valve 32. As illustrated in FIG. 1, these solenoid block 37 and valve block 35 are disposed coaxially, and are disposed along a direction perpendicular to an axial direction of the outer tube 3. As illustrated in FIG. 2, these valve block 35 and solenoid block 37 are disposed in a cylindrical case 40. The case 40 is formed by fixing a valve case 41 containing the valve block 35 and a solenoid case 42 containing the solenoid block 37 by crimping via a crimp portion 45A according to the first embodiment. The solenoid block 37 is disposed on a radially outermost side of the outer tube 3 on the one end side. The valve block 35 is disposed on a closer side to the outer tube 3 on the other end side. The case 40 corresponds to a tubular member.

Figure 3:
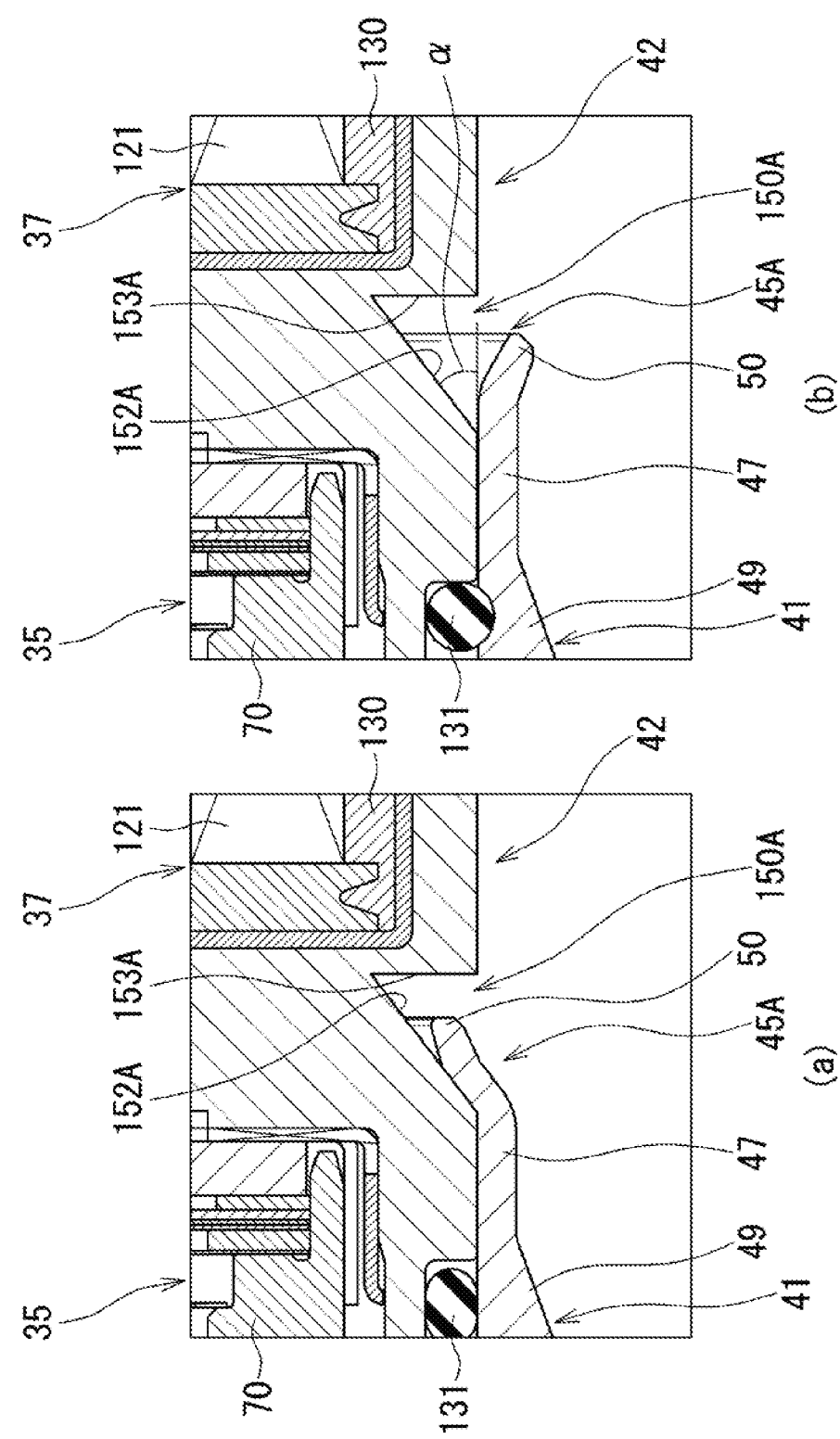
FIGS. 3(b) and 3(a) illustrate a crimp portion according to a first embodiment, and are an enlarged cross-sectional view before crimp fixation via this crimp portion and an enlarged cross-sectional view after the crimp fixation, respectively.

The valve block 35 is contained in the cylindrical valve case 41. The valve case 41 corresponds to a second tubular body. The valve case 41 includes a thick wall portion 48 and a thin wall portion 47. The thin wall portion 47 is provided on the one end side continuously from this thick wall portion 48. The thick wall portion 48 and the thin wall portion 47 are connected via a tapered wall portion 49, which is reducing in diameter toward the one end side. An inner diameter at the thin wall portion 47 and an inner diameter at the thick wall portion 48 are approximately equal to each other in the valve case 41. Referring to FIG. 3(*b*), a protrusion portion 50 provided in an obliquely outwardly protruding manner is formed at one end portion of the thin wall portion 47. The thin wall portion 47 including this protrusion portion 50 forms the crimp portion 45A according to the first embodiment, which will be described below. As illustrated in FIG. 2, an inner flange 52 provided in an inwardly protruding manner is formed at the other end portion of the valve case 41 continuously from the thick wall portion 48. An opening 53 is formed on an inner side of this inner flange 52. A plurality of cutouts 54 is formed at one end surface of this inner flange 52. The cutouts 54 establish communication between inside the reservoir 4 and a hydraulic chamber 72 (which will be described below) in the valve case 41. The other end surface of the inner flange 52 of the valve case 41 is in abutment with an outer peripheral surface of the outer tube 3, and these valve case 41 and outer tube 3 are fixed by welding or the like.

The inside of a main body 68 of the valve block 35, which will be described below, and the connection port 23 of the separator tube 20 are in communication with each other via a passage member 60. This passage member 60 includes a cylindrical portion 61 and an annular flange portion 62. The cylindrical portion 61 includes a communication passage 63 therein. The flange portion 62 is provided in a manner radially protruding from an outer periphery of one end portion of this cylindrical portion 61. An inner peripheral surface and an outer peripheral surface of the cylindrical portion 61 of the passage member 60, and one end surface and the other end surface of an inner peripheral side of the flange portion 62 are covered with a seal member 66. Then, the flange portion 62 of the passage member 60 is in close contact with the other end surface of the main body 68, which will be described below, and is also in abutment with the inner flange 52 of the valve case 41. Further, the cylindrical portion 61 is inserted through the opening 53 of the valve case 41, and a distal end portion thereof is in close contact with inside the connection port 23. As a result, the connection port 23 and the inside of the main body 68 are in communication with each other via the communication passage 63 of the communication member 60, and a joint portion between the connection port 23 and the main body 68 is sealed by the seal member 66 of the passage member 60.

The valve block 35 includes the main valve 32, the main body 68 on which this main valve 32 is seated, a pilot pin 69, a pilot valve 36, a pilot body 70 on which this pilot valve 36 is seated, and the failure-safe valve 33. The hydraulic chamber 72 is formed between the main body 68 and the pilot body 70, and the valve case 41. A support hole 74 is formed at a radial center of the main body 68. The support hole 74 axially penetrates through the main body 68. The other end portion of the pilot pin 69 is supported in this support hole 74. A plurality of axially penetrating passages 75 is formed at the main body 68 around the support hole 74 at intervals along a circumferential direction. The support hole 74 and each of the passages 75 of the main body 68 are in communication with the communication passage 63 in the cylindrical portion 61 of the passage member 60.

The pilot pin 69 is cylindrically formed. An orifice passage 76 and a large-diameter flow passage 77 are formed at this pilot pin 69. The orifice passage 76 is opened at the other end thereof and extends axially. The large-diameter flow passage 77 is opened at one end thereof and extends axially, and is in communication with the orifice passage 76. An annular protrusion portion 81 is provided at this pilot pin 69 in a manner protruding outward from an outer peripheral surface of an axially approximately middle position thereof. The other end side of the pilot pin 69 is supported by the support hole 74 of the main body 68, and therefore the support hole 74, and the large-diameter flow passage 77 and the orifice passage 76 of the pilot pin 69 are in communication with each other. A plurality of main disk valves 32A as the main valve 32 is supported between the annular protrusion portion 81 of the pilot pin 69 and one end surface of the main body 68.

The pilot body 70 is disposed on one end side of the pilot pin 69. This pilot body 70 is formed into a generally H-like shape in cross section. An opening of the pilot body 70 at one end thereof is closed by a holding plate 85, which includes a through-hole 84 at a radial center thereof. As a result, a valve chamber 86 is formed between the pilot body 70 and the holding plate 85. An actuation rod 125 is inserted through the through-hole 84. A plurality of communication passages 88 is formed on an inner peripheral surface of the through-hole 84 of the holding plate 85 along the circumferential direction. A spacer 90 is disposed in a range extending from between the holding plate 85 and a bottom portion of the solenoid case 42 of the solenoid block 37 to an outer periphery of the pilot body 70 on one end thereof. This spacer 90 includes a disk portion 92 and a cylindrical portion 93. The disk portion 92 includes a through-hole 91. The cylindrical portion 93 extends from an outer peripheral edge of this disk portion 92 toward the other end side. The cylindrical portion 93 is formed in a wavelike manner along the circumferential direction. A plurality of cutout portions 94 is formed on the disk portion 92 in a range radially extending from an inner peripheral surface of the through-hole 91 of the disk portion 92 to one end portion of the cylindrical portion 93.

A small-diameter communication hole 97 and a large-diameter support hole 98 are formed in the pilot body 70. The small-diameter communication hole 97 is opened at a radial center of one end surface of the pilot body 70 and extends axially. The large-diameter support hole 98 is opened at a radial center of the other end surface of the pilot body 70, and is in communication with the small-diameter communication hole 97. This large-diameter support hole 98 is formed so as to have a smaller inner diameter than an outer diameter of the pilot pin 69. Then, one end of the pilot pin 69 is supported in this large-diameter support hole 98, and the small-diameter communication hole 97 of the pilot body 70, and the large-diameter flow passage 77 and the orifice passage 76 of the pilot pin 69 are in communication with each other. A communication passage 80 is formed between the large-diameter support hole 98 and one end of the pilot pin 69. A plurality of passages 100 is formed at the pilot body 70 around the small-diameter communication hole 97 and the large-diameter support hole 98 at intervals along the circumferential direction. The passages 100 penetrate through the pilot body 70 so as to communicate with the valve chamber 86. A slitted disk 102 and a flexible disk 103 are supported between the annular protrusion portion 81 of the pilot pin 69 and the pilot body 70 so as to cover each of the passages 100. Then, a back-pressure chamber 105 is formed in a range surrounded by the main disk valve 32A disposed on the one end side of the main body 68, and the slitted disk 102 and the flexible disk 103 disposed on the other end side of the pilot body 70. This back-pressure chamber 105 is in communication with the small-diameter communication hole 97 of the pilot body 70 via the slit of the slitted disk 102 and the communication passage 80.

The pilot valve 36 is seated on and separates from a seat portion around the small-diameter communication hole 97 of the pilot body 70. This pilot valve 36 includes a pilot valve member 108 and a plurality of spring members 109. The spring members 109 are thin disk-like members elastically supporting this pilot valve member 108. The pilot valve member 108 functions to open and close the small-diameter communication hole 97 of the pilot body 70 by being seated on and separating from the pilot body 70. This pilot valve member 108 includes a through-hole 111 and a containing hole 112. The through-hole 111 is formed into a bottomed cylindrical shape, and is provided at the other end. The containing hole 112 is in communication with this through-hole 111, and contain the other end portion of the actuation rod 125. The other end portion of the actuation rod 125 is contained in the containing hole 112 of the pilot valve member 108. A spring holder portion 113 provided in a radially protruding manner is formed on an outer peripheral surface of the pilot valve member 108 at a position offset to the one end. A plurality of failure-safe disks 33A as the failure-safe valve 33 is supported between one end side of the spring holder portion 113 and the holding plate 85.

The solenoid block 37 is contained in the cylindrical solenoid case 42. This solenoid case 42 corresponds to a first tubular member. The solenoid block 37 is constructed by assembling and integrating a coil 121 wound around a bobbin 120, a pair of cores 122 and 123 inserted in the coil 121, a plunger 124 supported axially movably between the cores 122 and 123, and the hollow actuation rod 125 coupled with the plunger 124 in the solenoid case 42. They are fixed by an annular spacer 127 and a cup-shaped cover 128 that are attached to one end portion of the solenoid case 42 by crimping. The coil 121 wound around the bobbin 120 is protected by a mold resin portion 130. A lead wire (not illustrated) for supplying power to the coil 121 extends out of the cup-shaped cover 128. These coil 121, cores 122 and 123, plunger 124, and actuation rod 125 form a solenoid actuator. Then, supplying power to the coil 121 via the lead wire causes an axial thrust force to be generated on the plunger 124 (the actuation rod 125) according to an electric current thereof.

The other end of the solenoid case 42 is disposed inside the one end side of the valve case 41, and the valve case 41 is fixed to the solenoid case 42 by being crimped thereto via the crimp portion 45A according to the first embodiment. An outer diameter of the solenoid case 42 is approximately equal to an inner diameter of the valve case 41. The solenoid case 42 and the valve case 41 are liquid-tightly connected to each other due to a seal member 131. Also referring to FIGS. 3(a) and 3(b), the crimp portion 45A according to the first embodiment includes a crimp groove portion 150A according to the first embodiment and the one end portion of the thin wall portion 47 of the valve case 41. The crimp groove portion 150A is provided on an outer peripheral surface of the solenoid case 42 on the other end side. The one end portion of the thin wall portion 47 of the valve case 41 is contained while being bent in the crimp groove portion 150A of the solenoid case 42. The crimp groove portion 150A according to the first embodiment is formed along a circumferential direction of the outer peripheral surface of the solenoid case 42. This crimp groove portion 150A includes an inclined surface 152A and a radial flat surface 153A. The inclined surface 152A is inclined into the case 40 from the valve case 41 side toward the solenoid case 42 side (from the other end side toward the one end side) continuously from the outer peripheral surface of the solenoid case 42. The radial flat surface 153A is provided on an opposite side from the valve case 41 side, and extends to the outer peripheral surface of the solenoid case 42 along a radial direction of the solenoid case 42 continuously from an end portion of this inclined surface 152A.

An inclination angle α of the inclined surface 152A with respect to an axial direction of the solenoid case 42 is set within a range of 30 degrees to 50 degrees. In the present embodiment, the inclination angle α of the inclined surface 152A with respect to the axial direction of the solenoid case 42 is set to 38 degrees. An intersection point between the inclined surface 152A and the radial flat surface 153A is positioned on a radially inner side with respect to an outer peripheral surface of the mold resin portion 130 protecting the coil 121. Further, when the other end of the solenoid case 42 is placed in the valve case 41, a gap extending along the axial direction is formed between one end of the protrusion portion 50 provided on the thin wall portion 47 of the valve case 41 and the radial flat surface 153A of the crimp groove portion 150A. Further, an intersection point between the outer peripheral surface of the solenoid case 42 and the inclined surface 152A is positioned on the other end side (the seal member 131 side) with respect to a starting point of the protrusion portion 50 provided on the thin wall portion 47 of the valve case 41.

Then, at the time of placing the other end of the solenoid case 42 into the valve case 41 and fixing these cases 41 and 42 to each other by the crimping, first, the passage member 60 is inserted into the valve case 41 from the one end side thereof. The flange portion 62 of the passage member 60 is brought into abutment with onto the inner flange 52 of the valve case 41. The cylindrical portion 61 of the passage member 60 is inserted through the inner opening 53 from the inner flange 52 of the valve case 41. After that, the valve block 35 and the solenoid block 37 are joined and integrated with each other. They are inserted into the valve case 41, and the other end surface of the main body 68 of the valve block 35 is brought into abutment with the flange portion 62 of the passage member 60 while the other end portion of the solenoid case 42 is brought into abutment with the inner side of the valve case 41 on the one end side thereof.

As a result, as illustrated in FIGS. 3(a) and 3(b), the gap extending along the axial direction is formed between the one end of the protrusion portion 50 provided on the thin wall portion 47 of the valve case 41 and the radial flat surface 153A of the crimp groove portion 150A, and the intersection point between the outer peripheral surface of the solenoid case 42 and the inclined surface 152A of the crimp groove portion 150A according to the first embodiment are positioned on the other end side with respect to the starting point of the protrusion portion 50 provided on the thin wall portion 47 of the valve case 41.

After that, the one end portion of the thin wall portion 47 of the valve case 41 is bent into the case 40 with use of a not-illustrated crimping tool moving from the one end side toward the other end side along the axial direction on an radially outer side of the solenoid case 42. As a result, the inner peripheral surface of the one end portion of the thin wall portion 47 of the valve case 41 except for the protrusion portion 50 is brought into abutment with the inclined surface 152A provided on the crimp groove portion 150A of the solenoid case 42. At this time, the inner peripheral surface of the protrusion portion 50 provided on the thin wall portion 47 is brought into a state floating without abutting against the inclined surface 152A of the crimp groove portion 150A. As a result, the other end of the solenoid case 42 is fixed in the valve case 41 by the crimping via the crimp portion 45A according to the first embodiment.

Next, functions of the damping force adjustable shock absorber 1 according to the embodiment of the present invention will be described.

First, during an extension stroke of the piston rod 6, the check valve 13 of the piston 5 is closed due to a movement of the piston 5 in the cylinder 2. Before the disk valve 14 is opened, the oil fluid on the cylinder upper chamber 2A side is pressurized and passes through the passage 22 and the annular passage 21, and flows from the connection port 23 of the separator tube 20 into the communication passage 63 of the passage member 60 of the damping force generation unit 25. After that, the oil fluid passes through the damping force generation unit 25, by which the damping force is generated. Then, the oil fluid returns to the reservoir 4.

During this extension stroke, the oil fluid flows into the cylinder lower chamber 2B by passing through from the reservoir 4 to the passage 15 of the base valve 10 and opening the check valve 17 by an amount corresponding to the movement of the piston 5. When the pressure in the cylinder upper chamber 2A reaches a pressure for opening the disk valve 14 of the piston 5, the disk valve 14 is opened to release the pressure to the cylinder lower chamber 2B via the passage 11, thereby preventing an excessive increase in the pressure in the cylinder upper chamber 2A.

On the other hand, during a compression stoke of the piston rod 6, the check valve 13 is opened due to the oil fluid flowing through the passage 12 of the piston 5 while the check valve 17 of the base valve 10 is closed according to the movement of the piston 5 in the cylinder 2. Then, before the disk valve 18 is opened, the oil fluid in the cylinder lower chamber 2B flows into the cylinder upper chamber 2A via the passage 12. The oil fluid passes through the passage 22 and the annular passage 21 from the cylinder upper chamber 2A and flows from the connection port 23 of the separator tube 20 into the communication passage 63 of the passage member 60 of the damping force generation unit 25 by an amount corresponding to the entry of the piston rod 6 into the cylinder 2. After that, the oil fluid passes through the damping force generation unit 25, by which the damping force is generated. Then, the oil fluid returns to the reservoir 4. When the pressure in the cylinder lower chamber 2B reaches a pressure for opening the disk valve 18 of the piston 10, the disk valve 18 is opened to release the pressure to the reservoir 4 via the passage 16, thereby preventing an excessive increase in the pressure in the cylinder lower chamber 2B.

Then, at the damping force generation unit 25, the power supply to the coil 121 of the solenoid block 37 causes the pilot valve member 108 to be advanced by the actuation rod 125 against the biasing force of the spring member 109, and the distal end thereof to be seated on the seat portion around the small-diameter communication hole 97 of the pilot body 70. As a result, pressure control based on the pilot valve 36 can be realized by controlling a pressure for opening the pilot valve 36 according to the electric current supplied to the coil 121.

More specifically, the oil fluid functions in the following manner at the damping force generation unit 25 during the extension stroke and the compression stroke of the piston rod 6. After flowing into the support hole 74 of the main body 68 and each of the passages 75 via the communication passage 63 of the passage member 60, the oil fluid flows into the valve chamber 86 by passing through from the orifice passage 76 of the pilot pin 69 and the large-diameter flow passage 77 to the small-diameter communication hole 97 of the pilot body 70 and pushing and opening the pilot valve member 108 of the pilot valve 36 before the main disk valves 32A of the main disk 32 are opened (a piston speed low-speed range). Then, the oil fluid in the valve chamber 86 flows into the reservoir 4 by passing through from each of the communication passages 88 of the holding plate 85 to the cutout portions 94 of the spacer 90, the fluid chamber 72 in the valve case 41, and the cutouts 54 provided at the inner flange 52 of the valve case 41. Then, when the piston speed increases and the pressure on the cylinder upper chamber 2A side of the cylinder 2 reaches the pressure for opening the main disk valves 32A, the oil fluid directly flows into the hydraulic chamber 72 in the valve case 41 by passing through each of the passages 75 of the main body 68 and pushing and opening each of the main disk valves 32A after passing through the communication passage 63 of the passage member 60.

In this manner, at the damping force generation unit 25, the damping force is generated due to the orifice passage 76 of the pilot pin 69 and the pressure for opening the pilot valve member 108 of the pilot valve 36 before each of the main disk valves 32A of the main valve 32 is opened (the piston speed low-speed range). Further, the damping force is generated according to an opening degree of each of the main disks 32A after each of the main disk valves 32A is opened (a piston speed high-speed region). Then, the damping force can be directly controlled regardless of the piston speed by adjusting the pressure for opening the pilot valve 36 based on the electric current supply to the coil 121. More specifically, the inner pressure in the back-pressure chamber 105 is changed by an inflow of the oil fluid into the back-pressure chamber 105 via the small-diameter communication hole 97 of the pilot body 70, the communication passage 80, and the slit of the slitted disk 102 according to the pressure for opening the pilot valve 36. This inner pressure in the back-pressure chamber 105 is applied in a direction for closing each of the main disk valves 32A, and therefore controlling the pressure for opening the pilot valve 36 allows the pressure for opening each of the main disk valves 32A to be adjusted at the same time, thereby allowing the damping force characteristic to be adjusted in a wider range.

Further, when the thrust force on the plunger 124 (the actuation rod 125) is lost due to occurrence of a failure such as a disconnection of the coil 121 and a malfunction of an in-vehicle controller, the pilot valve member 108 is retracted due to the biasing force of the spring member 109, thereby bringing the one end surface of the spring holder portion 113 into abutment with each of the failure-safe disk valves 33A of the failure-safe valve 33. Then, with the pilot valve member 108 kept in this state, the oil fluid in the valve chamber 86 flows into the fluid chamber 72 in the valve case 41 via each of the communication passages 88 of the holding plate 85 and the cutout portions 94 of the spacer 90 by pushing and opening the failure-safe valve 33 (each of the failure-safe disk valves 33A). The present configuration leads to the control exerted on the flow of the oil fluid directed from the valve chamber 86 to the fluid chamber 72 in the valve case 41 by the failure-safe valve 33 (each of the failure-safe disk valves 33A) in this manner, thereby being able to adjust the inner pressure in the back-pressure chamber 105, i.e., the pressure for opening each of the main disk valves 32A of the main valve 32 along with generating a desired damping force with the aid of the setting of the pressure for opening the failure-safe valve 33 (each of the failure-safe disk valves 33A). As a result, an appropriate damping force can be acquired even at the time of a failure.

In the above-described damping force adjustable shock absorber 1 according to the present embodiment, the valve case 41 and the solenoid case 42 are fixed by the crimping via the crimp portion 45A according to the first embodiment. Especially, the crimp groove portion 150A according to the first embodiment includes the inclined surface 152A, which is inclined into the case 40 from the valve case 41 side toward the solenoid case 42 side (from the other end side toward the one end side) continuously from the outer peripheral surface of the solenoid case 42. Then, when the one end portion of the thin wall portion 47 of the valve case 41 is bent inward with use of the crimping tool moving along the axial direction on the radially outer side of the solenoid case 42, the inner peripheral surface of the one end portion of the thin wall portion 47 of the valve case 41 except for the protrusion portion 50 is fixed by the crimping in abutment with the inclined surface 152A provided on the crimp groove portion 150A of the solenoid case 42.

As a result, the crimp portion 45A according to the first embodiment can ensure that the thin wall portion 47 of the valve case 41 is bent at a predetermined angle (corresponding to the inclination angle α of the inclined surface 152A) while absorbing a variation in a crimp allowance thereof.

Further, while the crimp is being shaped with use of the crimping tool, the crimp portion 45A according to the first embodiment allows a shaping load along the axial direction of the case 40 to be distributed, thereby contributing to reducing a load on the valve block 35 and the solenoid block 37. More specifically, while the crimp is being shaped, the shaping load along the axial direction of the case 40 from the crimping tool is distributed in the direction perpendicular to the inclined surface 152A of the crimp groove portion 150A and the direction along the inclined surface 152A. As a result, the valve block 35 and the solenoid block 37 are subjected to a smaller load than the shaping load along the axial direction from the crimping tool, and therefore the load can be reduced on the valve block 35 and the solenoid block while the crimp is being shaped. As a result, the damping force adjustable shock absorber 1 can prevent damage on each component of the valve block 35 and the solenoid block 37, thereby improving reliability. Further, because the shaping load can be distributed while the crimp is being shaped, the damping force adjustable shock absorber 1 can allow the thin wall portion 47 of the valve case 41 to have a greater thickness and a shaping load along the axial direction thereof to increase, thus being able to maintaining superiority over a load for detachment.

Figure 4:
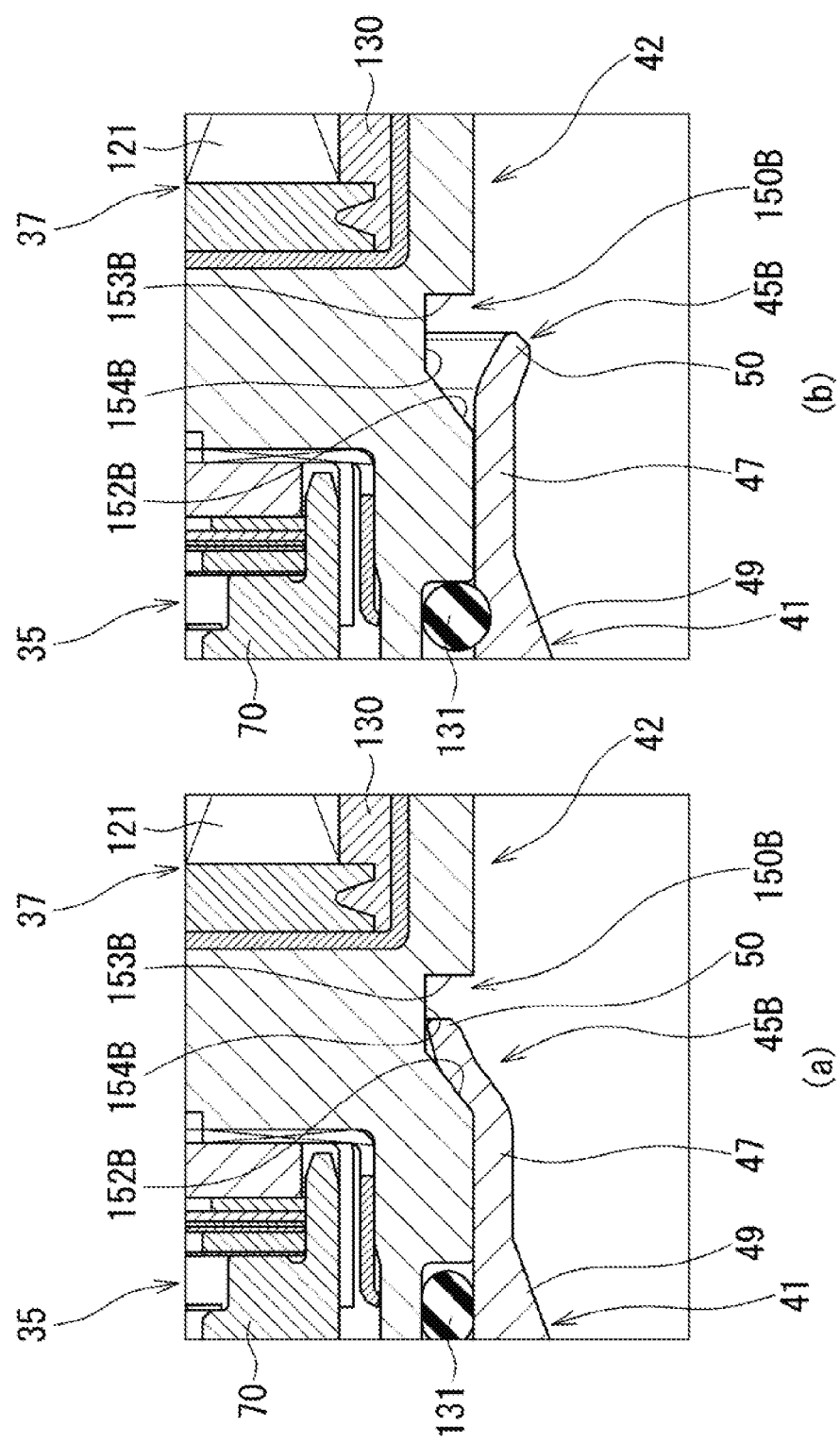
FIGS. 4(b) and 4(a) illustrate a crimp portion according to a second embodiment, and are an enlarged cross-sectional view before crimp fixation via this crimp portion and an enlarged cross-sectional view after the crimp fixation, respectively.

Next, a crimp portion 45B according to a second embodiment will be described with reference to FIGS. 4(a) and 4(b). The crimp portion 45B according to the second embodiment is different from the crimp portion 45A according to the first embodiment in terms of a shape of a crimp groove portion 150B provided on the outer peripheral surface of the solenoid case 42 on the other end side. The crimp groove portion 150B according to the second embodiment includes an inclined surface 152B, an axial flat surface 154B, and a radial flat surface 153B. The inclined surface 152B is inclined into the case 40 from the valve case 41 side toward the solenoid case 42 side continuously from the outer peripheral surface of the solenoid case 42. The axial flat surface 154B is provided continuously from an end portion of this inclined surface 152B on an opposite side from the valve case 41 side, and extends along the axial direction of the case 40. The radial flat surface 153B is provided continuously from an end portion of this axial flat surface 154B, and extends to the outer peripheral surface of the solenoid case 42 along the radial direction of the solenoid case 42. The inclined surface 152B of the crimp groove portion 150B according to the second embodiment is inclined at the same inclination angle α as the inclined surface 152A of the crimp groove portion 150A according to the first embodiment. The axial flat surface 154B of the crimp groove portion 150B according to the second embodiment corresponds to a first flat surface.

The axial flat surface 154B of the crimp groove portion 150B according to the second embodiment is positioned on the radially outer side of the case 40 with respect to the mold resin portion 130 protecting the coil 121. As a result, an intersection point between the axial flat surface 154B and the radial flat surface 153B is positioned on the radially outer side of the solenoid case 42 with respect to the mold resin portion 130. The radial flat surface 153B of the crimp groove portion 150B according to the second embodiment is located at the same position in the axial direction of the solenoid case 42 as the radial flat surface 153A of the crimp groove portion 150A according to the first embodiment. Further, when the other end of the solenoid case 42 is placed in the valve case 41, the one end of the protrusion portion 50 provided on the thin wall portion 47 of the valve case 41 is disposed at an approximately axially middle position of the axial flat surface 154B. A gap extending along the axial direction is formed between the one end of the protrusion portion 50 provided on the thin wall portion 47 of the valve case 41 and the radial flat surface 153B of the crimp groove portion 150B. Further, an intersection point between the outer peripheral surface of the solenoid case 42 and the inclined surface 152B is positioned on the other end side (the seal member 131 side) with respect to the starting point of the protrusion portion 50 provided on the thin wall portion 47 of the valve case 41.

Then, the one end portion of the thin wall portion 47 of the valve case 41 is bent toward the inner side of the case 40 with use of the crimping tool at the crimp portion 45B according to the second embodiment after the other end of the solenoid case 42 is placed in the valve case 41. As a result, the inner peripheral surface of the one end portion of the thin wall portion 47 of the valve case 41 except for the protrusion portion 50 is brought into abutment with the inclined surface 152B provided on the crimp groove portion 150B. Further, the inner peripheral edge of the one end of the protrusion portion 50 provided on the thin wall portion 47 of the valve case 41 is brought into contact with the axial flat surface 154B provided on the crimp groove portion 150B. At this time, the inner peripheral surface of the protrusion portion 50 provided on the thin wall portion 47 is brought into a state floating without abutting against the inclined surface 152B and the axial flat surface 154B of the crimp groove portion 150B. As a result, the other end of the solenoid case 42 is fixed in the valve case 41 by the crimping via the crimp portion 45B according to the second embodiment.

Now, the crimp portion 45A according to the first embodiment involves such a risk that, because the wall is thin between the radial flat surface 153A of the crimp groove portion 150A according to the first embodiment and the mold resin portion 130 of the coil 121, a magnetic flux may be saturated at this thin portion in formation of a magnetic field from the coil 121, leading to a failure to acquire a predetermined thrust force. However, the crimp groove portion 150B of the crimp portion 45B according to the second embodiment is configured in such a manner that the axial flat surface 154B is provided and this axial flat surface 154B is positioned on the radially outer side of the case 40 with respect to the mold resin portion 130, thereby allowing a thicker wall portion to be generated between the crimp groove portion 150B according to the second embodiment and the mold resin portion 130 of the coil 121 than in the first embodiment. As a result, the damping force adjustable shock absorber 1 can prevent the magnetic flux from being saturated, and acquire the predetermined thrust force. Further, the crimp portion 45B according to the second embodiment can bring about similar advantageous effects to the crimp portion 45A according to the first embodiment.

Figure 5:
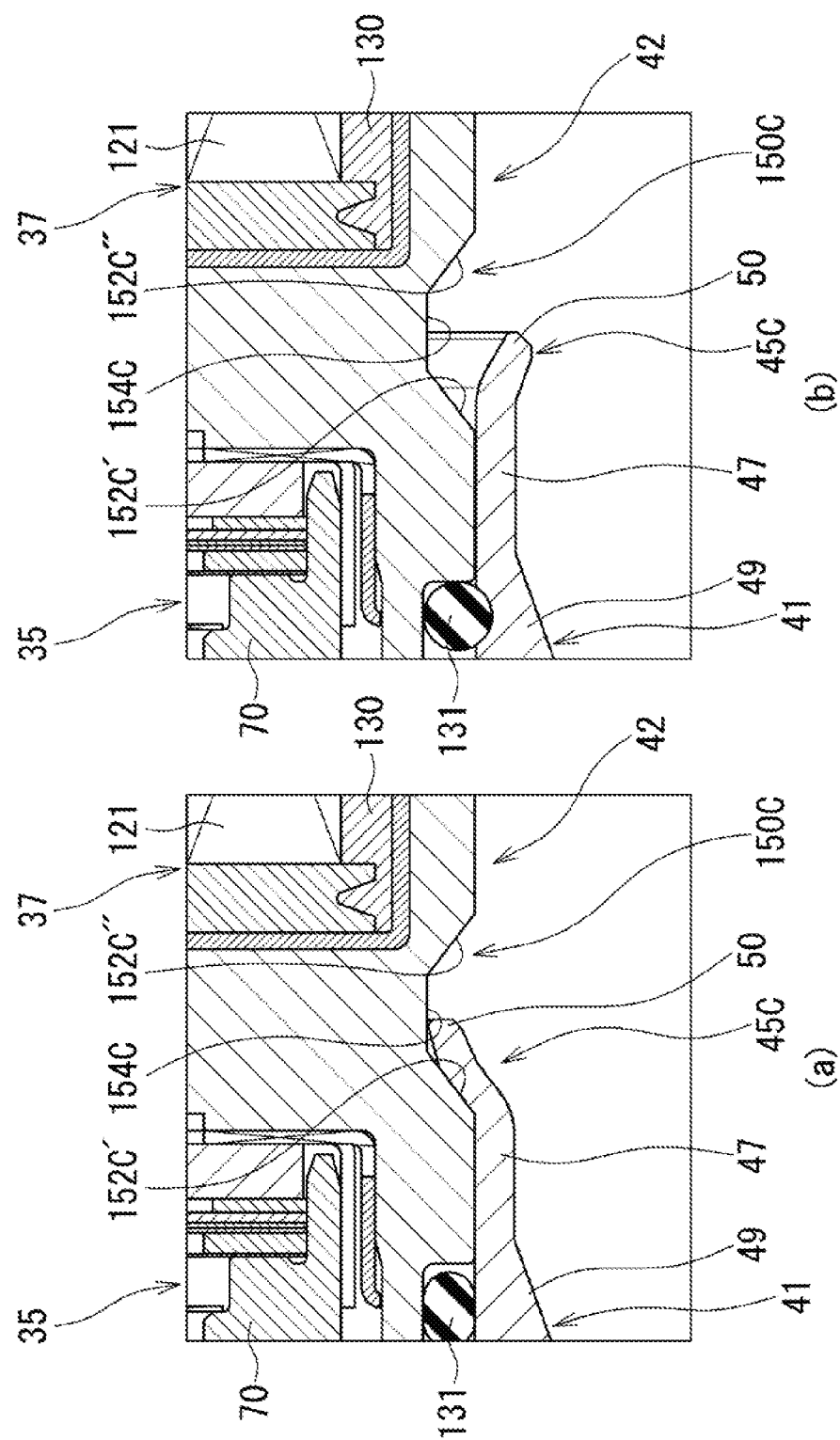
FIGS. 5(b) and 5(a) illustrate a crimp portion according to a third embodiment, and are an enlarged cross-sectional view before crimp fixation via this crimp portion and an enlarged cross-sectional view after the crimp fixation, respectively.

Next, a crimp portion 45C according to a third embodiment will be described with reference to FIGS. 5(a) and 5(b). The crimp portion 45C according to the third embodiment is different from the crimp portion 45B according to the second embodiment in terms of a shape of a crimp groove portion 150C provided on the outer peripheral surface of the solenoid case 42 on the other end side. The crimp groove portion 150C according to the third embodiment includes a first incline surface 152C', an axial flat surface 154C, and a second inclined surface 152C". The first inclined surface 152C' is inclined into the case 40 from the valve case 41 side toward the solenoid case 42 side continuously from the outer peripheral surface of the solenoid case 42. The axial flat surface 154C is provided continuously from an end portion of this first inclined surface 152C' on an opposite side from the valve case 41 side, and extends along the axial direction of the case 40. The second inclined surface 152C" extends from the outer peripheral surface of the solenoid case 42 to an end portion of the axial flat surface 154C, is inclined into the case 40 from the solenoid case 42 side toward the valve case 41 side (from the one end side toward the other end side), and is shallower than the axial flat surface 154C.

The axial flat surface 154C and the second inclined surface 152C" of the crimp groove portion 150C according to the third embodiment correspond to the first flat surface and the second flat surface, respectively. The first inclined surface 152C' and the axial flat surface 154C of the crimp groove portion 150C according to the third embodiment are configured in a similar manner to the inclined surface 152B and the axial flat surface 154B of the crimp groove portion 150B according to the second embodiment, and the crimp groove portion 150C according to the third embodiment is configured in such a manner that the radial flat surface 153B of the crimp groove portion 150B according to the second embodiment is replaced with the second inclined surface 152C". The second inclined surface 152C" of the crimp groove portion 150C according to the third embodiment is formed symmetrically with the first inclined surface 152' about the radial direction of the solenoid case 42.

Then, the one end portion of the thin wall portion 47 of the valve case 41 is bent toward the inner side of the case 40 with use of the crimping tool at the crimp portion 45C according to the third embodiment after the other end of the solenoid case 42 is placed in the valve case 41. As a result, the inner peripheral surface of the one end portion of the thin wall portion 47 of the valve case 41 except for the protrusion portion 50 is brought into abutment with the inclined surface 152C' provided on the crimp groove portion 150C, similarly to the crimp portion 45B according to the second embodiment. Further, the inner peripheral edge of the one end of the protrusion portion 50 provided on the thin wall portion 47 of the valve case 41 is brought into contact with the axial flat surface 154C provided on the crimp groove portion 150C. As a result, the other end of the solenoid case 42 is fixed in the valve case 41 by the crimping via the crimp portion 45C according to the third embodiment.

The above-described crimp groove portion 150C according to the third embodiment can also bring about similar advantageous effects to the crimp portion 45A according to the first embodiment, and, in addition, allows a relief clearance to be formed by the second inclined surface 152C" with respect to a region where the one end portion of the thin wall portion 47 moves when the one end portion of the thin wall portion 47 of the valve case 41 is bent into the case 40 with use of the crimping tool, thereby allowing the crimp processing to be efficiently carried out.

Figure 6:
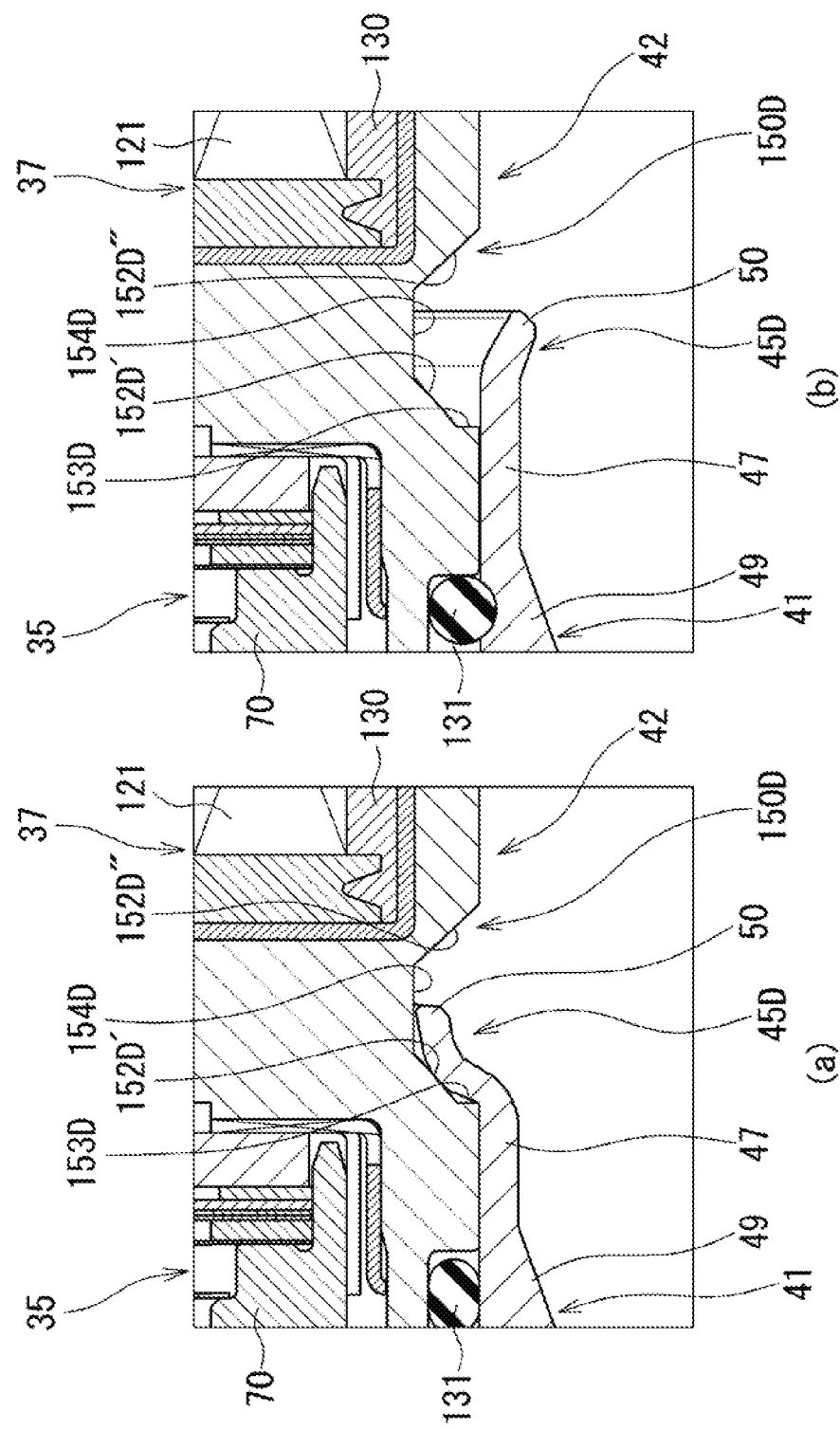
FIGS. 6(b) and 6(a) illustrate a crimp portion according to a fourth embodiment, and are an enlarged cross-sectional view before crimp fixation via this crimp portion and an enlarged cross-sectional view after the crimp fixation, respectively.

Next, a crimp portion 45D according to a fourth embodiment will be described with reference to FIGS. 6(a) and 6(b). The crimp portion 45D according to the fourth embodiment is different from the crimp portion 45C according to the third embodiment in terms of a shape of a crimp groove portion 150D provided on the outer peripheral surface of the other end side of the solenoid case 42. The crimp groove portion 150D according to the fourth embodiment includes a radial flat surface 153D, a first inclined surface 152D', an axial flat surface 154D, and a second inclined surface 152D". The radial flat surface 153D radially extends continuously from the outer peripheral surface of the solenoid case 42. The first inclined surface 152D' is provided continuously from an end portion of this radial flat surface 153D on an opposite side from the valve case 41 side, and is inclined into the case 40 from the valve case 41 side toward the solenoid case 42 side. The axial flat surface 154D is provided continuously from an end portion of this first inclined surface 152D' on an opposite side from the valve case 41 side, and extends along the axial direction of the case 40. The second inclined surface 152D" extends from the outer peripheral surface of the solenoid case 42 to an end portion of the axial flat surface 154D, and is inclined into the case 40 from the solenoid case 42 side toward the valve case 41 side.

The first inclined surface 152D', the axial flat surface 154D, and the second inclined surface 152D" of the crimp groove portion 150D according to the fourth embodiment are configured in a generally similar manner to the first inclined surface 152C', the axial flat surface 154C, and the second inclined surface 152C" of the crimp groove portion 150C according to the third embodiment, and the crimp groove portion 150D according to the fourth embodiment is configured in such a manner that the radial flat surface 153D is added to the crimp grove portion 150C according to the third embodiment. The axial flat surface 154D, the second inclined surface 152D", and the radial flat surface 153D of the crimp groove portion 150D according to the fourth embodiment correspond to the first flat surface, the second flat surface, and a third flat surface, respectively.

Then, the one end portion of the thin wall portion 47 of the valve case 41 is bent toward the inner side of the case 40 with use of the crimping tool at the crimp portion 45D according to the fourth embodiment after the other end of the solenoid case 42 is placed in the valve case 41. As a result, the one end portion of the thin wall portion 47 of the valve case 41 is bent toward the inner side of the case 40 based on an intersection point between the radial flat surface 153D of the crimp groove portion 150D and the outer peripheral surface of the solenoid case 42, and the inner peripheral surface of the one end portion of the thin wall portion 47 of the valve case 41 except for the protrusion portion 50 is brought into abutment with the first inclined surface 152D' of the crimp groove portion. Further, the inner peripheral edge of the one end of the protrusion portion 50 provided on the thin wall portion 47 of the valve case 41 is brought into contact with the axial flat surface 154D provided on the crimp groove portion 150D. At this time, the inner peripheral surface of the one end portion of the thin wall portion 47 of the valve case 41 expect for the protrusion portion 50 is out of contact with the radial flat surface 153D of the crimp groove portion 150D, and the inner peripheral surface of the protrusion portion 50 provided on the thin wall portion 47 is also brought into a state out of abutment with the first inclined surface 152D' and the axial flat surface 154D of the crimp groove portion 150D. As a result, the other end of the solenoid case 42 is fixed in the valve case 41 by the crimping via the crimp portion 45D according to the fourth embodiment.

The above-described crimp groove portion 150D according to the fourth embodiment can bring about similar advantageous effects to the crimp portion 45A according to the first embodiment, and, in addition, is provided with the radial flat surface 153D radially extending continuously from the outer peripheral surface of the solenoid case 42 and allows this radial flat surface 153D to fulfill a function as a reference surface based on which the thin wall portion 47 of the valve case 41 is bent at the time of the crimp processing, thereby contributing to improving productivity.

The present invention is not limited to the above-described embodiments, and includes various modifications.

For example, the above-described embodiments have been described in detail to facilitate better understanding of the present invention, and the present invention shall not necessarily be limited to the configurations including all of the described features. Further, a part of the configuration of some embodiment can be replaced with the configuration of another embodiment. Further, some embodiment can also be implemented with a configuration of another embodiment added to the configuration of this embodiment. Further, each of the embodiments can also be implemented with another configuration added, deleted, or replaced with respect to a part of the configuration of this embodiment.

The present application claims priority under the Paris Convention to Japanese Patent Application No. 2017-144523 filed on Jul. 26, 2017. The entire disclosure of Japanese Patent Application No. 2017-144523 filed on Jul. 26, 2017 including the specification, the claims, the drawings, and the abstract is incorporated herein by reference in its entirety.

REFERENCE SIGN LIST 1 damping force adjustable shock absorber
2 cylinder
2A cylinder upper chamber
2B cylinder lower chamber
3 outer tube
4 reservoir
5 piston
6 piston rod
25 damping force generation unit
35 valve block
37 solenoid block
40 case (tubular member)
41 valve case (second tubular body)
42 solenoid case (first tubular body)
45A to 45D crimp portion
47 thin wall portion
150A to 150D crimp groove portion
152A inclined surface
152B inclined surface
152C' first inclined surface
152C" second inclined surface (second flat surface)
152D first inclined surface
152D" second inclined surface (second flat surface)
153D radial flat surface (third flat surface)
154B axial flat surface (first flat surface)
154C axial flat surface (first flat surface)
154D axial flat surface (first flat surface)

The invention claimed is:

1. A damping force adjustable shock absorber comprising:
a cylinder;
an outer tube concentrically disposed outside the cylinder;
a piston slidably disposed in the cylinder;
a tubular member connected to the outer tube;
a damping force generation unit contained in the tubular member; and
a solenoid contained inside the tubular member, the solenoid being configured to drive the damping force generation unit,
wherein a damping force is generated by controlling a flow of hydraulic fluid accompanying a movement of the piston in the cylinder with use of the damping force generation unit,
wherein the tubular member includes
a first tubular body having a first end and a second end,
a second tubular body having a first end fixed to the second end of the first tubular body and a second end fixed to an outer peripheral surface of the outer tube, the first end of the second tubular body being disposed radially outside the first tubular body and the second tubular body is arranged along an axial direction in which the first tubular body extends, and
a crimp portion configured to fix the first end of the second tubular body to the second end of the first tubular body by crimping,
wherein the crimp portion includes
a groove portion provided in an outer peripheral surface of the first tubular body and extending along a circumferential direction thereof, and
an end portion of the second tubular body being bent so as to be contained in the groove portion, and
wherein the groove portion includes a first inclined surface that is radially inwardly inclined into the first tubular body in a direction from the second end of the first tubular body toward the first end of the first tubular body, and
a first flat surface extending along a radial direction of the first tubular body from an outer end of the first inclined surface to the outer peripheral surface of the first tubular body and toward an inner peripheral surface of the second tubular body.

2. The damping force adjustable shock absorber according to claim 1, wherein the groove portion further includes a second flat surface extending in the axial direction of the first tubular body from an inner end of the first inclined surface.

3. The damping force adjustable shock absorber according to claim 2, wherein the second flat surface extends along an axial direction of the tubular member.

4. The damping force adjustable shock absorber according to claim 2, wherein the groove portion further includes a third flat surface provided on an opposite side of the second flat surface in the axial direction of the first tubular body relative to the first inclined surface, and the second inclined surface is disposed radially outward relative to the second flat surface.

5. The damping force adjustable shock absorber according to claim 4, wherein the third flat surface is a second inclined surface that is radially outwardly inclined from the second flat surface to the outer peripheral surface of the first tubular body.

6. The damping force adjustable shock absorber according to claim 3, wherein the groove portion further includes a third flat surface provided on an opposite side of the second flat surface in the axial direction of the first tubular body relative to the first inclined surface, and the third flat surface is a second inclined surface that is disposed radially outward relative to the second flat surface.

7. The damping force adjustable shock absorber according to claim 6, wherein the third flat surface is the second inclined surface that is radially outwardly inclined from the second flat surface to the outer peripheral surface of the first tubular body.

* * * * *